US012558858B2

(12) United States Patent
Yoneshima

(10) Patent No.: US 12,558,858 B2
(45) Date of Patent: Feb. 24, 2026

(54) METHOD OF MANUFACTURING ELONGATED FOAM SHEET, METHOD OF MANUFACTURING COMPOSITE MATERIAL AND ELONGATED FOAM SHEET

(71) Applicant: Yoneshimafelt Co., Ltd., Osaka (JP)

(72) Inventor: Tomoya Yoneshima, Osaka (JP)

(73) Assignee: Millefeuille Composite corp., Osaka (JP)

( * ) Notice: Subject to any disclaimer, the term of this patent is extended or adjusted under 35 U.S.C. 154(b) by 93 days.

(21) Appl. No.: 18/087,847

(22) Filed: Dec. 23, 2022

(65) Prior Publication Data

US 2023/0127339 A1 Apr. 27, 2023

Related U.S. Application Data

(63) Continuation of application No. PCT/JP2021/037646, filed on Oct. 12, 2021.

(30) Foreign Application Priority Data

Oct. 15, 2020 (JP) ................................. 2020-173780

(51) Int. Cl.
*B29D 7/01* (2006.01)
*B29C 33/36* (2006.01)
(Continued)

(52) U.S. Cl.
CPC ................ *B29D 7/01* (2013.01); *B29C 33/36* (2013.01); *B29C 44/5654* (2013.01);
(Continued)

(58) Field of Classification Search
None
See application file for complete search history.

(56) References Cited

U.S. PATENT DOCUMENTS 8,496,775 B2 7/2013 Deng et al.
2002/0056513 A1* 5/2002 Tabuchi .................... B65C 9/20
156/267

(Continued)

FOREIGN PATENT DOCUMENTS

JP S56-004449 A 1/1981
JP 1988-019235 A 1/1988
(Continued)

OTHER PUBLICATIONS

International Search Report issued in PCT/JP2021/37646 mailed on Nov. 30, 2021 with English Translation (7 pages).
(Continued)

*Primary Examiner* — Michael N Orlando
*Assistant Examiner* — Abhishek A Patwardhan
(74) *Attorney, Agent, or Firm* — MCDONALD HOPKINS LLC

(57) ABSTRACT

In order to provide a manufacturing method of an elongated foam sheet capable of manufacturing the elongated foam sheet with highly-precise thickness without being limited by the material and thickness of foam material, a method of manufacturing an elongated foam sheet includes performing a slice process in which a foam sheet is created by slicing a foam block and a sheet pasting process in which a large number of foam sheets are arranged and pasted onto one side of an elongated base material sheet to manufacture the elongated foam sheet where the large number of foam sheets are lined up in a longitudinal direction of the base material sheet.

17 Claims, 12 Drawing Sheets

(51) Int. Cl.
| | |
|---|---|
| *B29C 44/56* | (2006.01) |
| *B29C 65/00* | (2006.01) |
| *B29C 65/48* | (2006.01) |
| *B32B 5/18* | (2006.01) |

(52) U.S. Cl.
CPC .......... *B29C 65/00* (2013.01); *B29C 65/4825* (2013.01); *B29C 66/45* (2013.01); *B32B 5/18* (2013.01); *B32B 2250/03* (2013.01); *B32B 2250/40* (2013.01)

(56) References Cited

U.S. PATENT DOCUMENTS

| | | | |
|---|---|---|---|
| 2006/0263558 | A1 | 11/2006 | Crum |
| 2006/0263594 | A1* | 11/2006 | Kraft ..................... G06Q 10/10 |
| | | | 156/247 |
| 2008/0113143 | A1* | 5/2008 | Taylor .................... B32B 5/245 |
| | | | 428/47 |
| 2011/0200813 | A1 | 8/2011 | Okura |
| 2014/0326390 | A1* | 11/2014 | Popp ................. A61F 13/15723 |
| | | | 156/267 |
| 2015/0181340 | A1 | 6/2015 | Nada |
| 2018/0194917 | A1 | 7/2018 | Dikeman et al. |
| 2019/0001735 | A1* | 1/2019 | Cathomen ................. B32B 7/12 |
| 2023/0102696 | A1* | 3/2023 | Nakayama ........... B29C 70/545 |
| | | | 264/46.4 |

FOREIGN PATENT DOCUMENTS

| | | |
|---|---|---|
| JP | H2-098008 A | 4/1990 |
| JP | H7-150122 A | 6/1995 |
| JP | 2001-171006 A | 6/2001 |
| JP | 2005-084606 A | 3/2005 |
| JP | 2019-006037 A | 1/2019 |
| WO | 2010/047274 A1 | 4/2010 |
| WO | 2014/017528 A1 | 1/2014 |

OTHER PUBLICATIONS

"KLEBESHOP24", https://web.archive.org/web/20200815044021/https://www.klebeshop24.de/.

* cited by examiner

F i g . 1
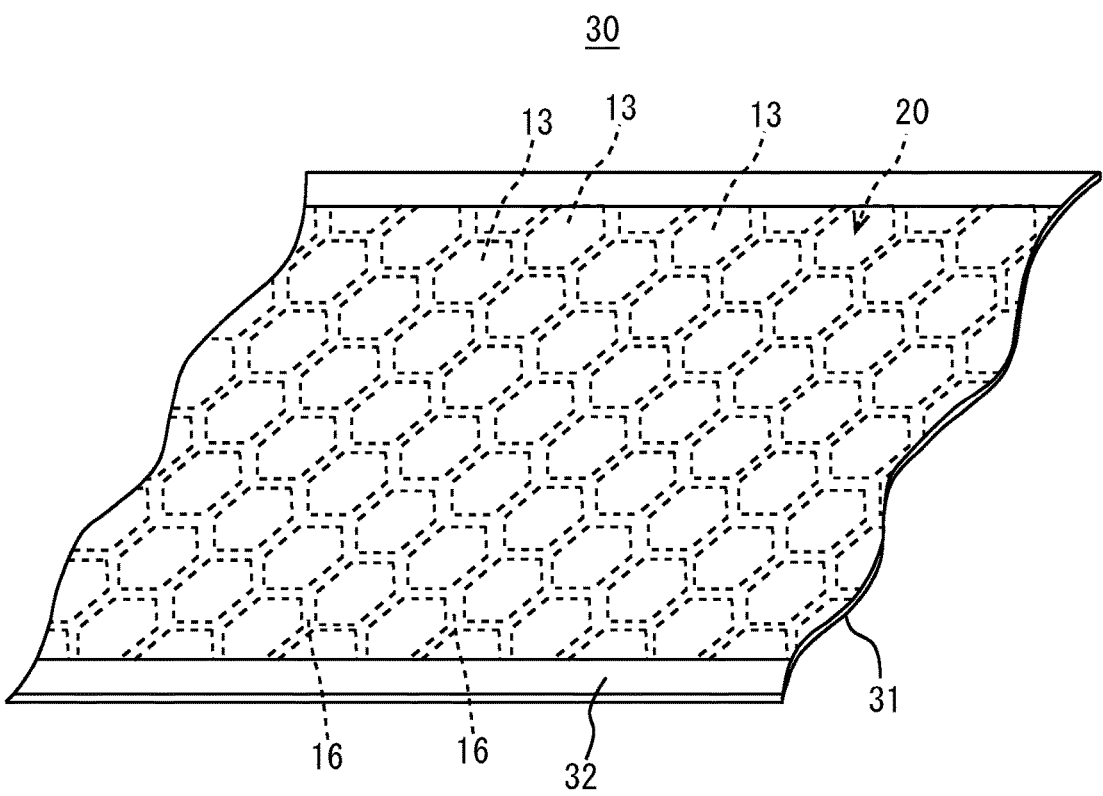
F i g . 2
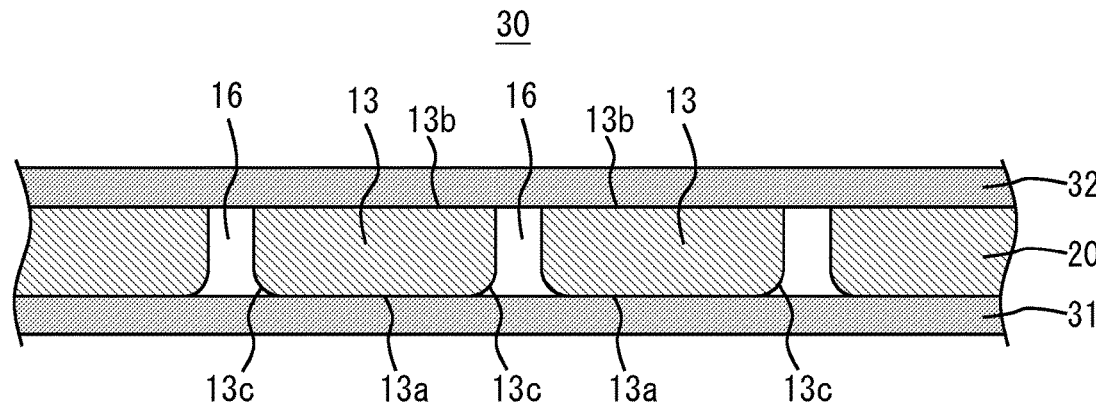

F i g . 5
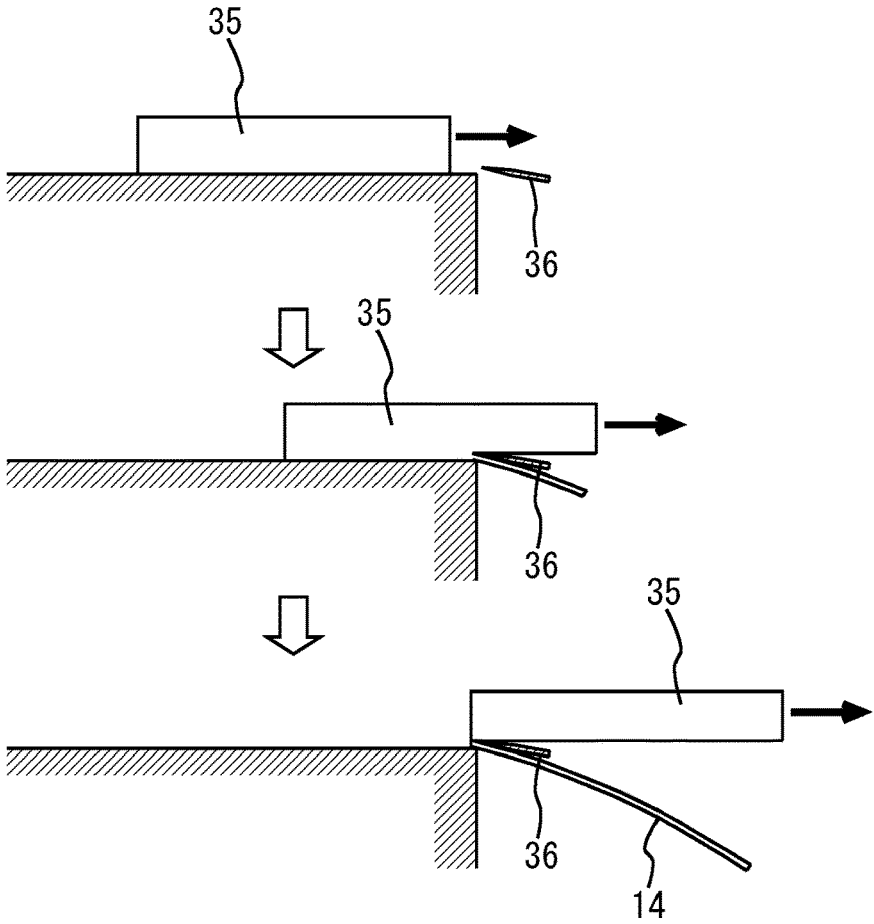
F i g . 6
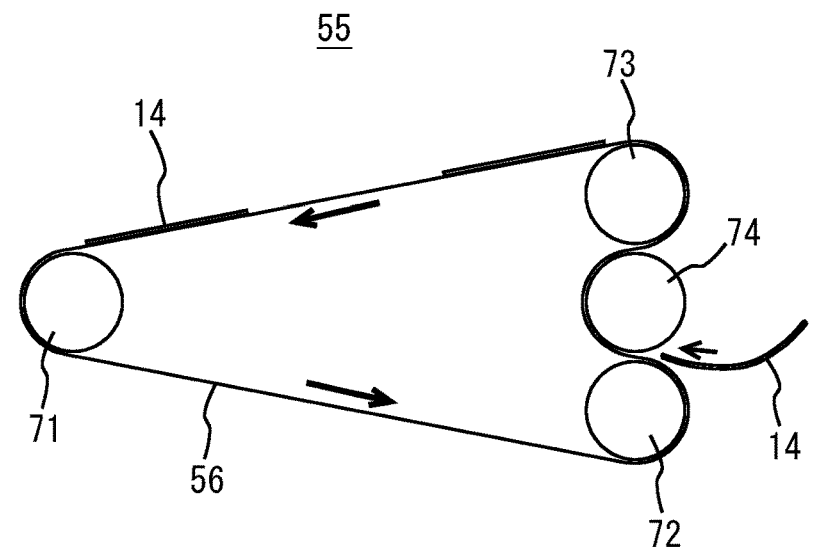

F i g . 7
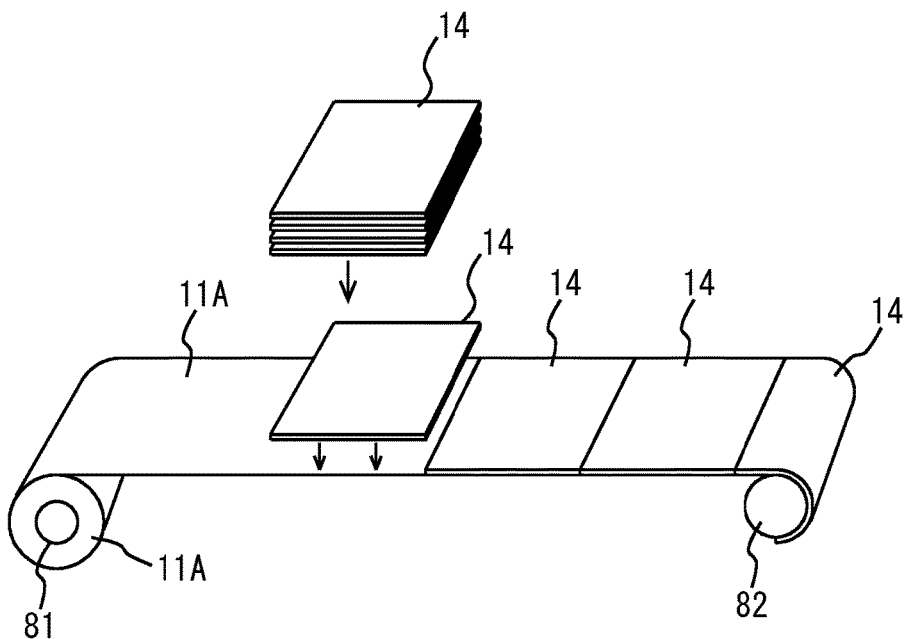
F i g . 8
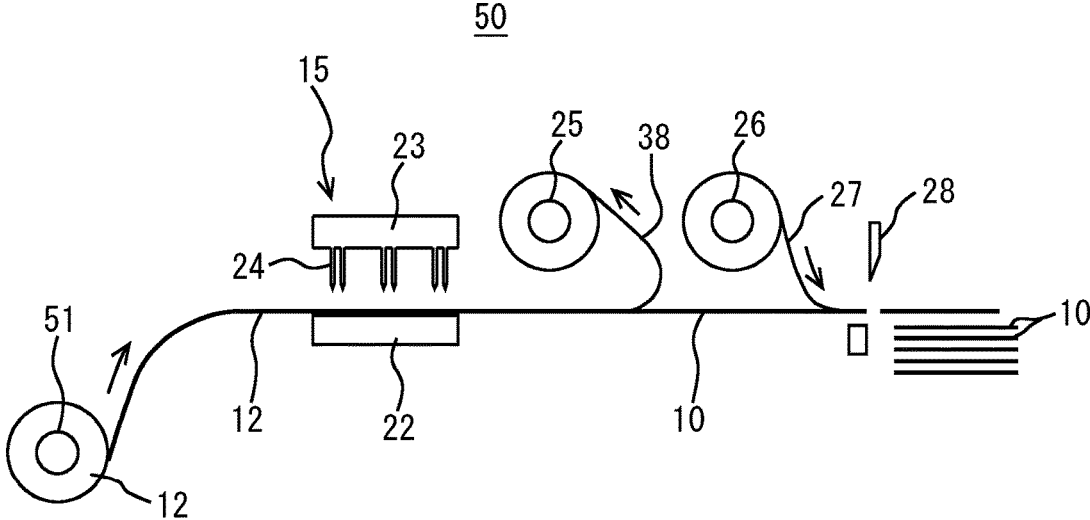

F i g . 9
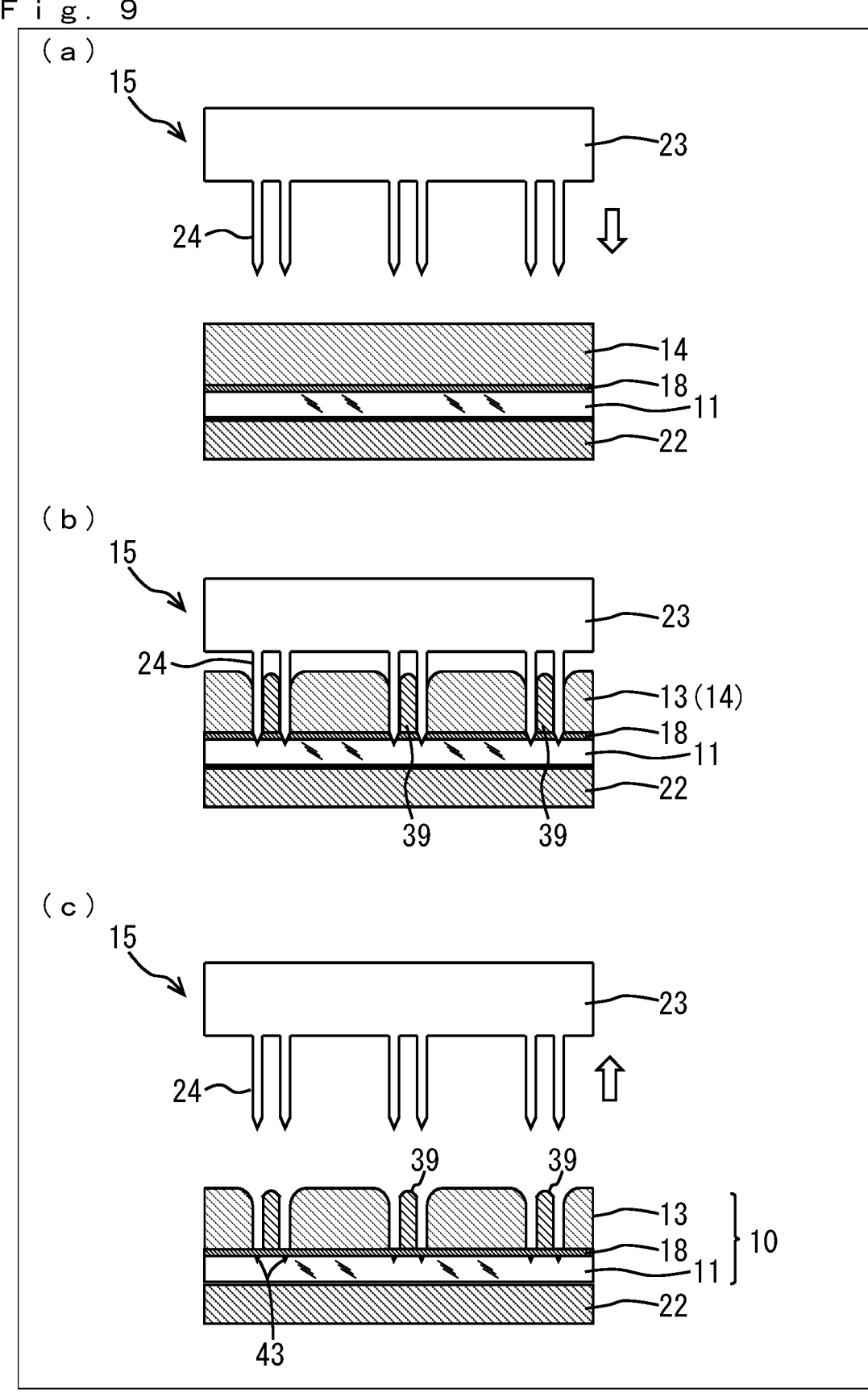

F i g .  1 0
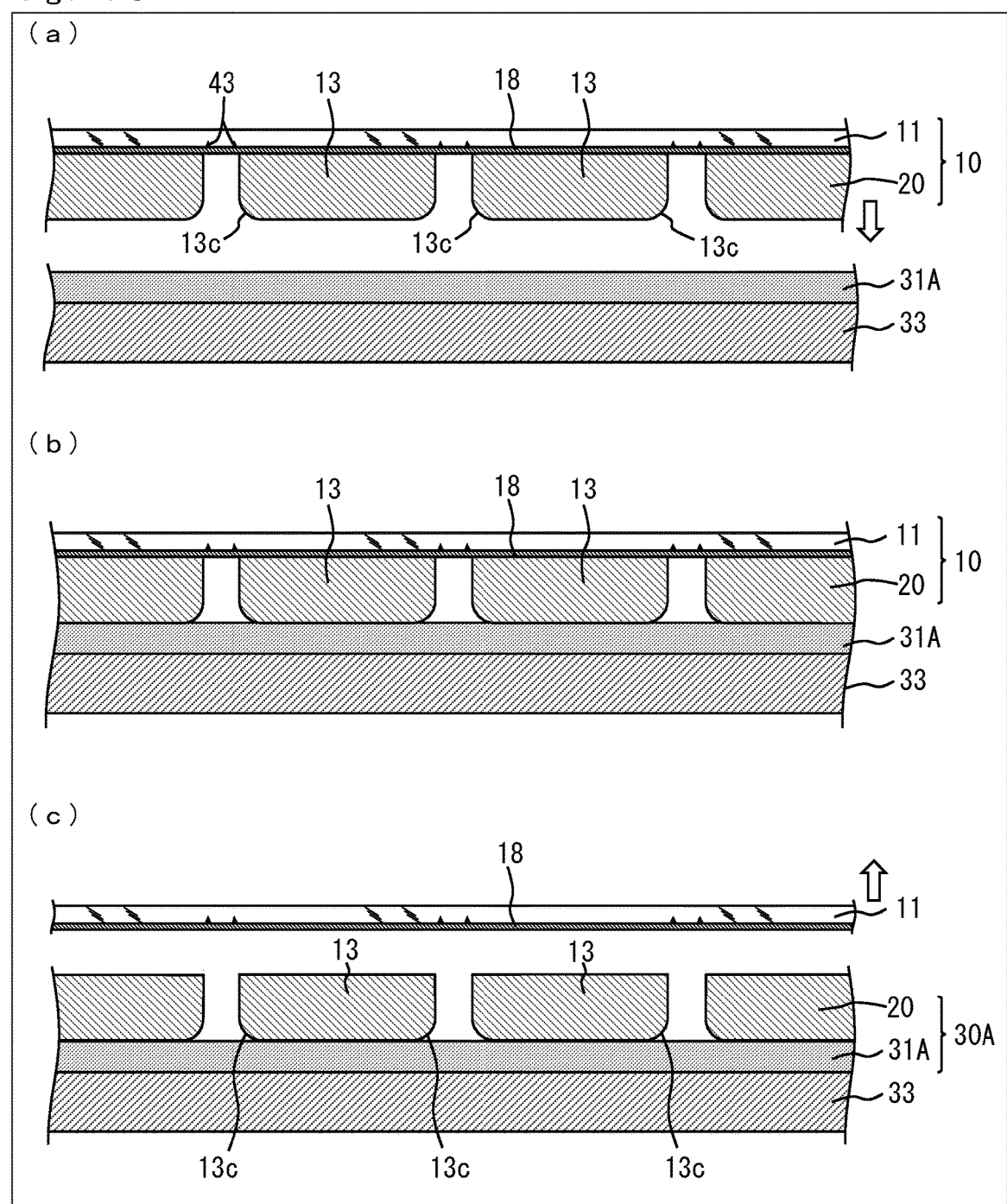

F i g .  1 1
(a)
32A
13          13
20
31A   } 30A
33
(b)
13          13
32A
20    } 30B
31A
33
13c          13c
F i g .  1 2
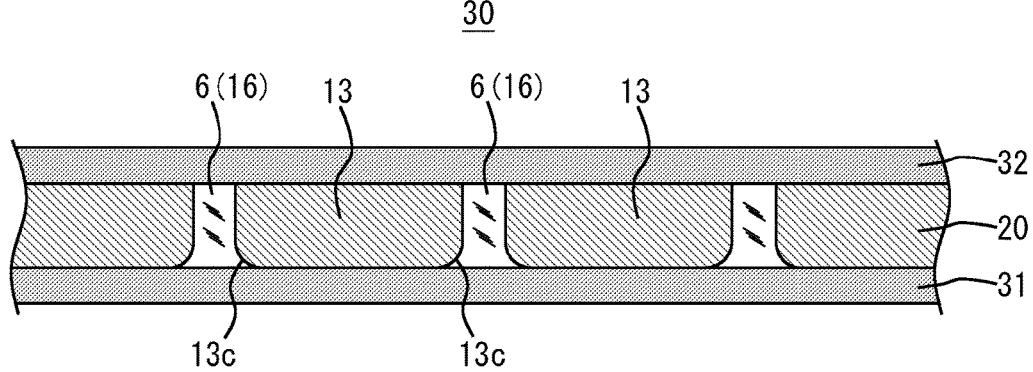
30
6 (16)    13    6 (16)    13
32
20
31
13c          13c (a)

(b)

(c)

F i g.  1 5
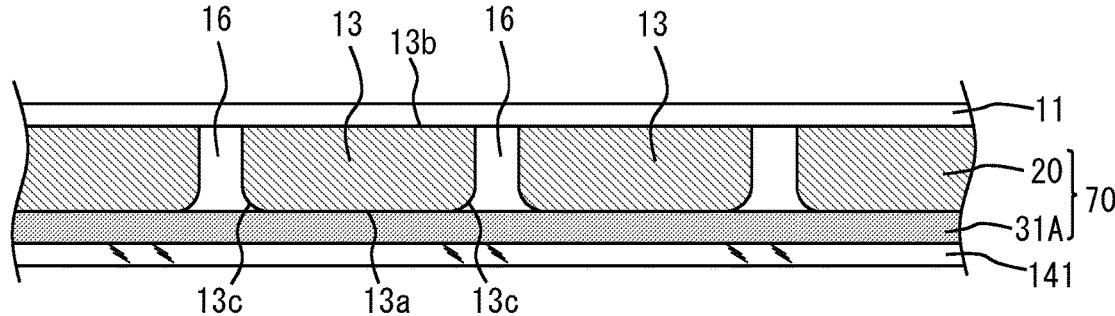
F i g.  1 6
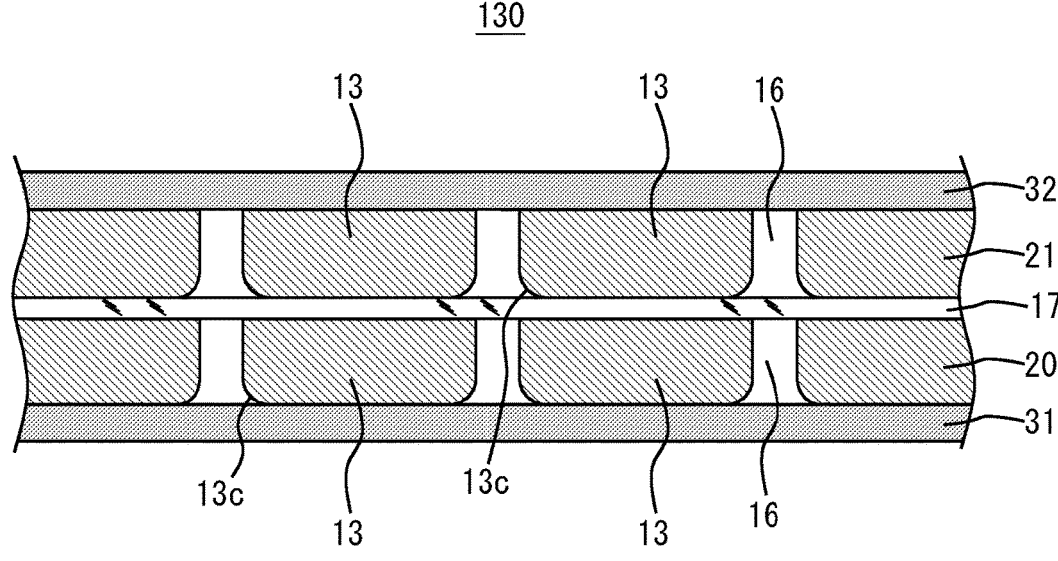

F i g .  1 7
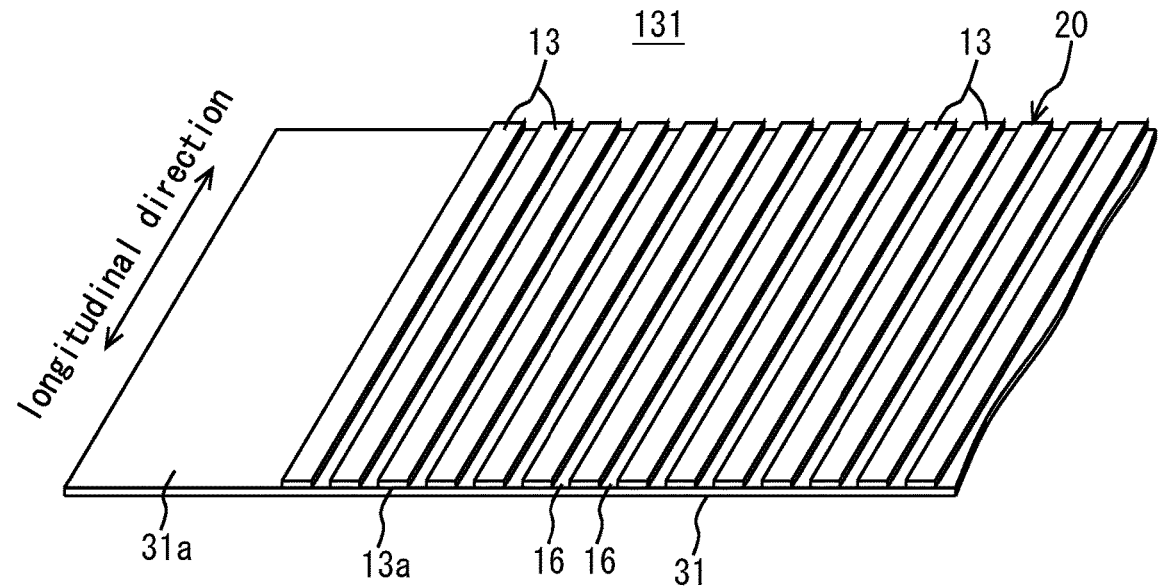
F i g .  1 8
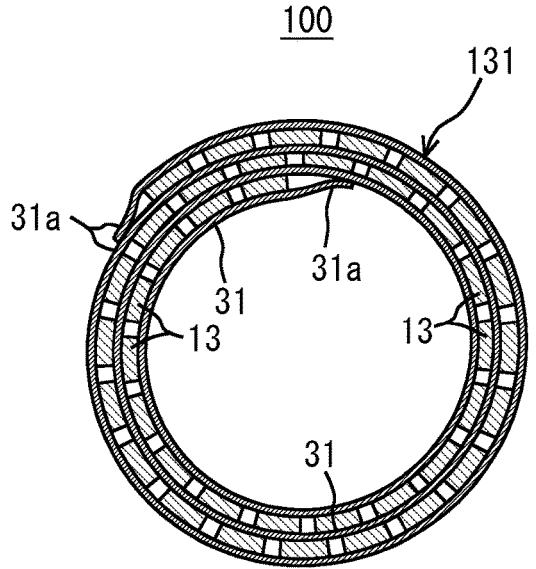

F i g .  1 9
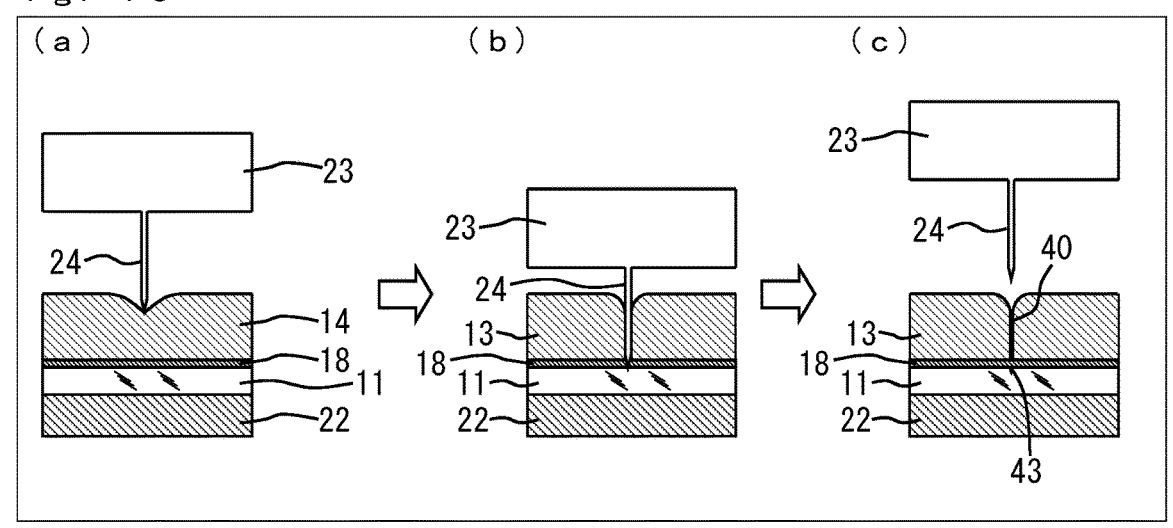
F i g .  2 0
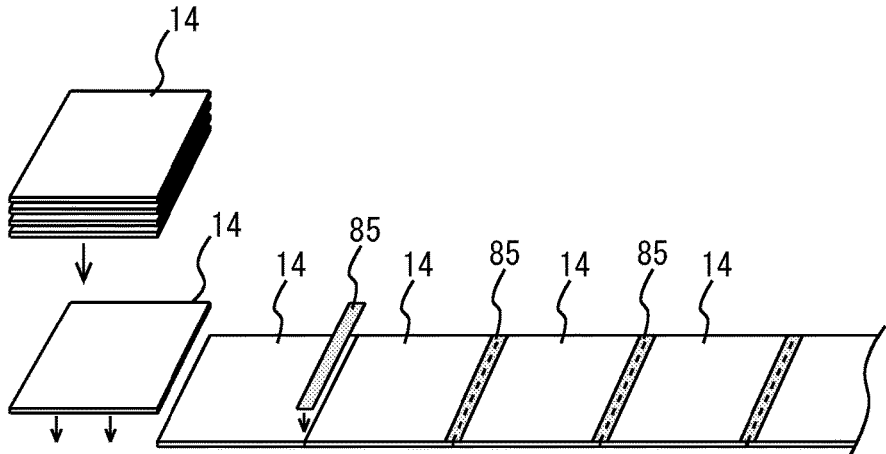

F i g .  2 1
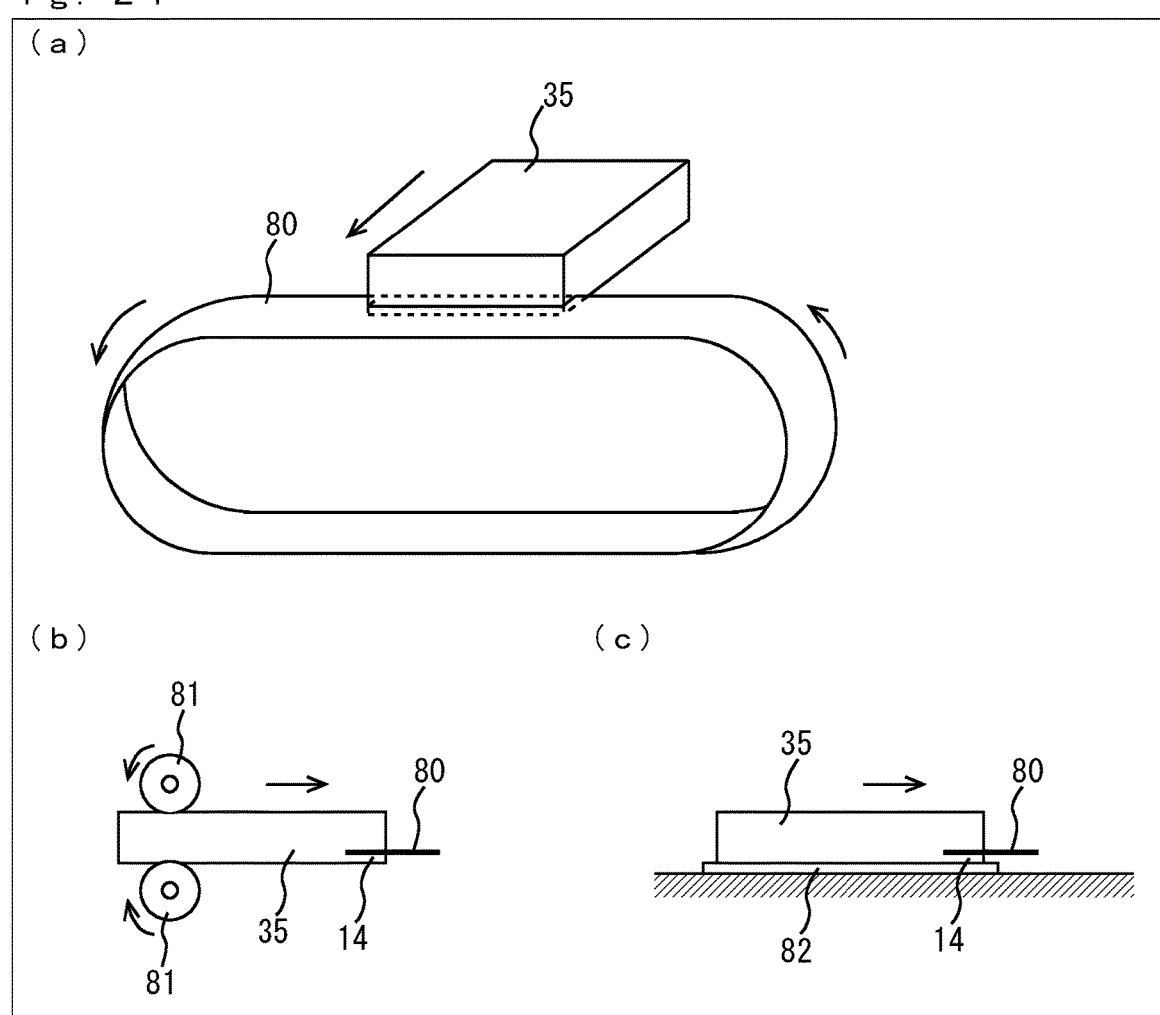

METHOD OF MANUFACTURING ELONGATED FOAM SHEET, METHOD OF MANUFACTURING COMPOSITE MATERIAL AND ELONGATED FOAM SHEET

TECHNICAL FIELD

The present disclosure relates to a method of manufacturing an elongated foam sheet used for materials, such as composite material.

BACKGROUND ART

Conventionally, composite materials in which core material is provided between skin materials are known. As the core material, foam material can be conveniently used. Patent Document 1 describes a fiber-reinforced composite material laminate provided with a core part containing foamed resin and a surface part having thermosetting resin containing carbon fiber.

On the other hand, Patent Document 2 describes, as a method of manufacturing thermoplastic resin foam film which is laminated with an aluminum foil, cutting (slicing) a rectangular foam material using a cutting machine. Further, Patent Document 3 describes a method of manufacturing a foam sheet from a cylindrical foam block. According to this method, an elongated thin foam sheet is manufactured by successively slicing the cylindrical foam block with a slicing blade in a manner in which the skin is stripped from the outer circumferential surface.

REFERENCE DOCUMENT(S) OF CONVENTIONAL ART

Patent Documents

[Patent Document 1] JP2019-006037A
[Patent Document 2] WO2010/047274A1
[Patent Document 3] JP1988-019235A

DESCRIPTION OF THE DISCLOSURE

Problem(s) to be Solved by the Disclosure

Meanwhile, although some foam sheets are manufactured in a thin-sheet shape during being foamed, by an extruded foaming method etc., many foam sheets are manufactured by cutting a foam block into a given thickness. In this case, the foam sheet inevitably becomes an individual sheet. The foam film (foam sheet) manufactured by the method of manufacturing thermoplastic resin foam film described in Patent Document 2 is also an individual sheet.

On the other hand, the present inventor invented a composite material etc. having an island structure in which a core material layer is comprised of a large number of plate-shaped flakes, and filed a patent application (JP2020-024756). As a method of obtaining the core material layer comprised of a large number of plate-shaped flakes, there is a method by punching a foam sheet, for example. However, when the foam sheet is an individual sheet, it is difficult to perform the punching successively. Further, when the foam sheet is an individual sheet, the successive processing is difficult also for successively pasting the foam sheet to an elongated roll material, such as a metal film and a fiber-reinforced resin.

Therefore, in order to realize the successive processing to improve the productivity, the present inventor came up with an idea of preparing an elongated foam sheet. However, according to the method of manufacturing the elongated foam sheet described in Patent Document 3, it is necessary to form the foam material in a cylindrical shape. Further, in processing with a slicing machine adapted for the cylindrical foam material, the material and the thickness of the processible foam material and the accuracy are extremely limited.

The present disclosure is made in view of such a situation, and one purpose thereof is to provide a method of manufacturing an elongated foam sheet, capable of manufacturing the elongated foam sheet with a highly-precise thickness, without being limited by the material and the thickness of foam material.

SUMMARY OF THE DISCLOSURE

In order to solve the above problems, according to the first aspect of the present disclosure, a method of manufacturing an elongated foam sheet is provided, which includes the step of performing a sheet pasting process in which a large number of foam sheets are arranged and pasted onto one side of an elongated base material sheet to manufacture the elongated foam sheet where the large number of foam sheets are lined up in a longitudinal direction of the base material sheet.

According to the second aspect of the present disclosure, the method of the first aspect may include the step of further performing, before the sheet pasting process, a slice process in which the foam sheet is created by slicing a foam block and a sheet stretching process in which a curl of the foam sheet created by the slice process is reduced. In the sheet pasting process, the foam sheet that is reduced in the curl by the sheet stretching process may be pasted to the base material sheet.

According to the third aspect of the present disclosure, the method of the first aspect may include the step of further performing, before the sheet pasting process, a slice process in which the foam sheet is created by slicing a foam block, and an inspection process in which the foam sheet created by the slice process is inspected for at least one of a weight and a thickness, as a target to be inspected, and the foam sheet that satisfies a screening standard is screened. In the sheet pasting process, the foam sheet that satisfies the screening standard in the inspection process may be pasted to the base material sheet.

According to the fourth aspect of the present disclosure, in the method of any one of the first to third aspects, the foam sheet may be a sheet of hard foam material.

According to the fifth aspect of the present disclosure, a method of manufacturing composite material is provided, which includes the step of performing a cutting process in which a foam sheet that constitutes an elongated foam sheet manufactured by the method of any one of the first to fourth aspects is divided into a large number of plate-shaped flakes by cutting, and a laminating process in which the large number of plate-shaped flakes divided by the cutting process are sandwiched between a pair of sheets for skin material.

According to the sixth aspect of the present disclosure, the method of the fifth aspect may include the step of further performing, after the sheet pasting process and before the cutting process, a sheet connection process in which the foam sheets that are adjacent to each other on the base material sheet are connected by a connecting member.

According to the seventh aspect of the present disclosure, in the method of the sixth aspect, a scrap other than the large number of plate-shaped flakes among the foam sheet after the cutting may be removed by winding.

According to the eighth aspect of the present disclosure, in the method of any one of the fifth to seventh aspects, in the cutting process, an intermediate sheet in which the large number of plate-shaped flakes are pasted to the base material sheet may be created. After the cutting process, a transfer process in which the large number of plate-shaped flakes on the intermediate sheet are transferred to one of the pair of sheets for skin material may be performed. In the laminating process, the other of the pair of sheets for skin material may be laminated to the large number of plate-shaped flakes transferred by the transfer process.

According to the ninth aspect of the present disclosure, in the method of any one of the fifth to seventh aspects, in the cutting process, an intermediate sheet in which the large number of plate-shaped flakes are pasted to the base material sheet may be created. In the laminating process, the intermediate sheet may be sandwiched between the pair of sheets for skin material.

According to the tenth aspect of the present disclosure, a method of manufacturing an elongated foam sheet is provided, which includes the step of performing a sheet connection process in which a large number of foam sheets are connected by a connecting member, while being arranged in a certain direction to manufacture the elongated foam sheet where the large number of foam sheets are lined up.

According to the eleventh aspect of the present disclosure, an elongated foam sheet is provided, which includes an elongated base material sheet, and a large number of foam sheets lined up in a longitudinal direction of the base material sheet and pasted to one side of the base material sheet. The base material sheet is rolled up with the large number of foam sheets.

Effect of the Disclosure

According to the present disclosure, the elongated foam sheet is manufactured by arranging and pasting the large number of foam sheets on one side of the elongated base material sheet. Here, although it is difficult to create the elongated foam sheet with highly-precise thickness from a cylindrical foam block without being limited by the material and thickness of the foam material, in the case of foam sheets with a short length, it is possible to prepare a large number of foam sheets manufactured with the highly-precise thickness. Therefore, by arranging and pasting the large number of foam sheets, it is possible to manufacture the elongated foam sheet with the highly-precise thickness, without being limited by the material and thickness of the foam material.

BRIEF DESCRIPTION OF DRAWINGS

FIG. 1 is a perspective view of a composite material according to one embodiment.

FIG. 2 is a cross-sectional view of the composite material according to this embodiment.

FIG. 5 is a cross-sectional view illustrating a slice process of a first manufacturing process according to this embodiment.

FIG. 6 is a schematic structural diagram illustrating a sheet stretching process of the first manufacturing process according to this embodiment.

FIG. 7 is a perspective view illustrating a sheet pasting process of the first manufacturing process according to this embodiment.

FIG. 8 is a schematic structural diagram of a production line used in a second manufacturing process according to this embodiment.

FIG. 9 shows cross-sectional views illustrating a cutting process of the second manufacturing process according to this embodiment.

FIG. 10 shows cross-sectional views illustrating a transfer process of a third manufacturing process according to this embodiment.

FIG. 11 shows cross-sectional views illustrating a laminating process of the third manufacturing process according to this embodiment.

FIG. 12 is a cross-sectional view of the composite material according to this embodiment, when filling up a gap with curing resin.

FIG. 15 is a cross-sectional view of a sheet for composite material production according to a third modification.

FIG. 16 is a cross-sectional view of a composite material according to a fourth modification.

FIG. 17 is a perspective view of a composite material according to a fifth modification.

FIG. 18 is a cross-sectional view of a cylindrical body using the composite material according to the fifth modification.

FIG. 19 shows cross-sectional views illustrating a situation of a composite material according to another modification in which a cut is made between adjacent plate-shaped flakes upon a press cut.

FIG. 20 is a perspective view illustrating a sheet connection process of a first manufacturing process of a method of manufacturing an elongated foam sheet according to another modification.

FIG. 21 shows views illustrating a slice process of a first manufacturing process according to another modification.

Figure 3:
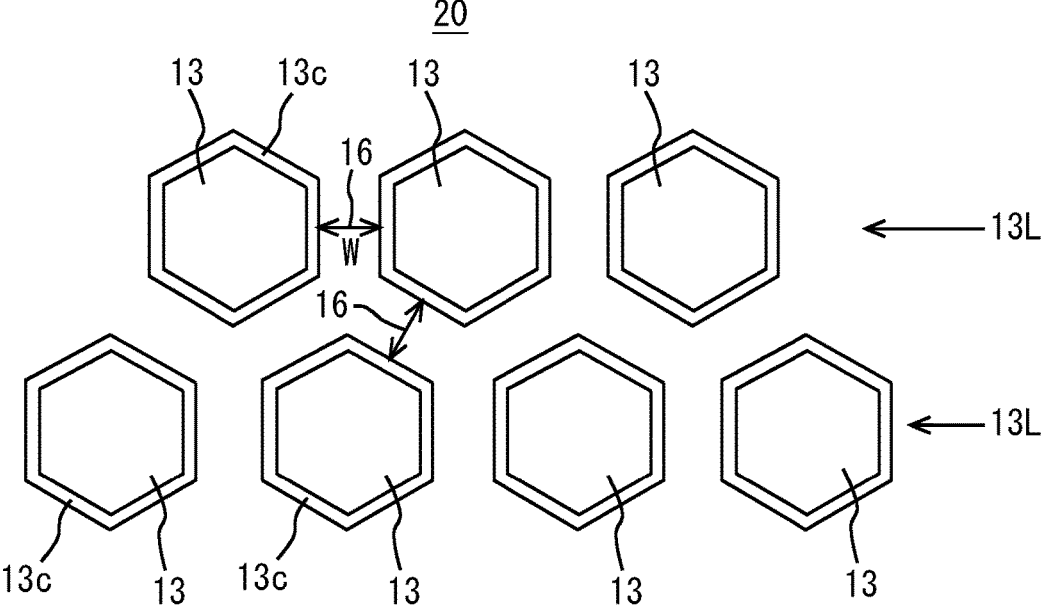
FIG. 3 is a plan view of a core material layer of the composite material according to this embodiment, on the side where chamfers are formed.

MODES FOR CARRYING OUT THE
DISCLOSURE

Hereinafter, one embodiment of the present disclosure is described in detail with reference to the drawings. Note that the following embodiment is one example of the present disclosure, and it is not intended to limit the scope of the present disclosure, its application, or its use.

This embodiment is a method of manufacturing a composite material 30 to which a method of manufacturing an elongated foam sheet (elongated foam film) 12 according to the present disclosure is applied. Below, after describing a configuration of the composite material 30 and a configuration of a transfer sheet 10 used for production of the composite material 30, the method of manufacturing the composite material 30 is described.

[Configuration of Composite Material]

As illustrated in FIGS. 1 and 2, the composite material 30 is a panel having a sandwich structure. The composite material 30 includes a core material layer (also referred to as a "middle layer") 20, a first skin material 31 laminated with the core material layer 20, and a second skin material 32 which is laminated with the core material layer 20 on the opposite side of the first skin material 31 and sandwiches the core material layer 20 with the first skin material 31. The composite material 30 may be used as panel material in which, for example, the light weight and the rigidity are more important than the strength. In detail, the composite material 30 may be used, as structural material, for panel material of movable bodies, such as airplanes, automobiles, or bicycles (e.g., sport bicycle), electric equipment, electronic equipment, office apparatuses, electrical household appliances, and medical equipment, or building materials. In the case of the movable bodies, the composite material 30 may be used as an aerodynamic component which constitutes cladding.

Each of the skin materials 31 and 32 is, for example, skin material or panel material which is made of material different from the core material layer 20. As material of each of the skin materials 31 and 32, any of metal, plastic, and inorganic material may be used. In this embodiment, fiber-reinforced plastic is used for the material of each of the skin materials 31 and 32. As the fiber-reinforced plastic, fiber-reinforced plastic reinforced by carbon fiber may be used. As the fiber-reinforced resin, prepreg (e.g., "Pyrofil Prepreg®" available from Mitsubishi Chemical Corporation) in which carbon fiber is impregnated with resin (matrix) may be used. Thermosetting epoxy resin is used as the matrix of the prepreg.

Note that, as the fiber of the fiber-reinforced plastic, any of inorganic fiber, organic fiber, and metal fiber may be used, and, for example, glass fiber, carbon fiber, aramid fiber, polyethylene fiber, polyester fiber, tungsten fiber, steel fiber, or boron fiber may be used. Further, as the matrix of the fiber-reinforced plastic, any of thermosetting resin and thermoplastic resin may be used, and, for example, polyester resin, epoxy resin, phenol resin, vinyl ester resin, polyimide resin, polypropylene resin, nylon resin, polyether-ether-ketone resin, polybutylene terephthalate resin, or bismaleimide resin may be used.

The core material layer 20 is laminated with each of the skin materials 31 and 32. In the core material layer 20, a large number of plate-shaped flakes 13 having the same thickness are arranged in a two-dimensional plane as the core material. The large number of plate-shaped flakes 13 are arranged along the surface of each of the skin materials 31 and 32. Each plate-shaped flake 13 is a thin flat-plate-shaped small flake. The plate-shaped flakes 13 are made of the same material, and have the same size and the same shape. Note that "a large number" of "a large number of plate-shaped flakes" herein means ten or more. The number of plate-shaped flakes 13 in the core material layer 20 is at least ten or more. Note that this number may also be 50 or more.

Material of which the density is smaller than the skin materials 31 and 32 may be used for the plate-shaped flake 13. In this embodiment, hard foam resin is used as the material of the plate-shaped flake 13. The density of the plate-shaped flake 13 is a value, for example, within a range of 30 kg/m³ or more and 500 kg/m³ or less.

As the hard foam resin used for the material of the plate-shaped flake 13, polystyrene foam material, polyvinyl chloride foam material, cellulose acetate foam material, polyurethane foam material, phenol foam material, epoxy foam material, acrylics foam material, polymethacrylimide foam material, polypropylene foam material, polyethylene terephthalate foam material, polycarbonate foam material, polyamideimide foam material, or polyphenylene sulfide foam material may be used. Among these, for example, as the polymethacrylimide foam material, polymethacrylimide (PMI) closed-cell foam material (e.g., "ROHACELL®" (Evonik Industries AG)) may be used.

As illustrated in FIG. 3, in the core material layer 20, the plan-view shape (contour shape) of the plate-shaped flake 13 is a regular polygon (in this embodiment, regular hexagon). Note that, as the plan-view shape of the plate-shaped flake 13, triangle, quadrangle, hexagon, or equilateral pentagon may be chosen, when uniformly covering with a large number of plate-shaped flakes 13. Further, the plan-view shape of the plate-shaped flake 13 may be other shapes, and other polygons, circle, or ellipse may also be chosen. The plan-view shape of the plate-shaped flake 13 may be chamfered at each corner, when the polygon is a basic shape.

The thickness of the plate-shaped flake 13 may be, for example, within a range of 0.05 mm or more and 10 mm or less (e.g., 0.05 mm or more and 2 mm or less). Further, as for the plan-view dimension of the plate-shaped flake 13, an average value of a distance from the center of gravity to the perimeter or contour (an average value over 360°, which is a radius in the case of a circle) may be a value within a range of 3 mm or more and 50 mm or less (e.g., 5 mm) When the plate-shaped flake 13 has a regular hexagonal shape, the length of one side may be a value within a range of 3 mm or more and 10 mm or less (e.g., 5 mm) Note that the dimension of the plate-shaped flake 13 may be a value outside the range described in this paragraph.

In the core material layer 20, all the plate-shaped flakes 13 are isolated from each other and are separate bodies. The entire perimeter of each plate-shaped flake 13 is separated from all other adjacent plate-shaped flakes 13 with a gap 16 therebetween. Each plate-shaped flake 13 has an island structure which is independent from others. The adjacent plate-shaped flakes 13 are not connected with each other through a connecting part made of the same material as the plate-shaped flakes 13. The composite material 30 is a multi-web panel in which each of the skin materials 31 and 32 functions as a flange of an I-beam structure, and each plate-shaped flake 13 functions as a web. The composite material 30 is a panel having a sandwich structure in which each plate-shaped flake 13 functions as core material.

The adjacent plate-shaped flakes 13 are arranged so that one side of one plate-shaped flake 13 opposes to one side of the other plate-shaped flake 13 with the gap 16 therebetween. A width W of the gap 16 varies according to the size of the gap between blades 24 which are adjacent to each other in an upper mold 23 (described later), for example. The width W of the gap 16 is constant along the sides which oppose to each other. Further, as for each plate-shaped flake 13, the widths W of the gaps 16 to which the respective sides face are equal. The size of the width W of the gap 16 is suitably designed according to the size etc. of the composite material 30, and, for example, it may be within a range of 0 mm or more and 10 mm or less.

In the core material layer 20, the large number of plate-shaped flakes 13 are disposed regularly. The core material layer 20 is uniformly covered with the large number of plate-shaped flakes 13. In this embodiment, as the layout of the plate-shaped flakes 13, a staggered layout in which the positions of the plate-shaped flakes 13 are offset by a half pitch between adjacent plate-shaped flake rows 13L is adopted. In this embodiment, the plan-view shape of each plate-shaped flake 13 is a regular hexagon, and the layout of the plate-shaped flakes 13 can also be said as a honeycomb layout in which the gap is formed between the adjacent plate-shaped flakes 13.

A chamfer 13c is formed in the entire perimeter of one of the principal surfaces (one of both surfaces 13a and 13b parallel to the arrangement surface of each plate-shaped flake 13) 13a (in FIG. 2, the lower surface) of each plate-shaped flake 13. The chamfer 13c is a trace (cutting mark) indicating that the plate-shaped flake 13 is formed by punching, and it is an arc-shaped curved surface (e.g., R-surface of about 0.05 mm) or a curved surface which is bulged outwardly like an arc. The shape of the chamfer 13c varies according to the shape of the point etc. of the blade 24 which is used for the punching. In each plate-shaped flake 13, the size of the chamfer 13c is substantially uniform throughout the perimeter. Note that the "principal surface" of the plate-shaped flake 13 is herein a surface on the front side or the back side.

Further, in the large number of plate-shaped flakes 13 (e.g., all the plate-shaped flakes 13 of the core material layer 20), the orientation of cutting in the thickness direction which can be discriminated based on the cutting marks formed in the perimeter as a trace of being manufactured using the transfer sheet 10 (described later) are mutually the same. In detail, in the large number of plate-shaped flakes 13, the chamfers 13c are formed in the perimeter of the principal surface 13a on the same side in the thickness direction.

[Configuration of Transfer Sheet]

Next, the transfer sheet 10 used for production of the composite material 30 is described. The transfer sheet 10 is a sheet which can transfer a large number of plate-shaped flakes 13 from a base material sheet 11 to other structural materials (e.g., a structure of which the surface has pressure-sensitive adhesiveness or adhesiveness). The transfer sheet 10 corresponds to an intermediate sheet. Note that the "intermediate sheet (intermediate material)" herein refers to a sheet created at a middle or intermediate process in the production process of the composite material 30.

Figure 4:
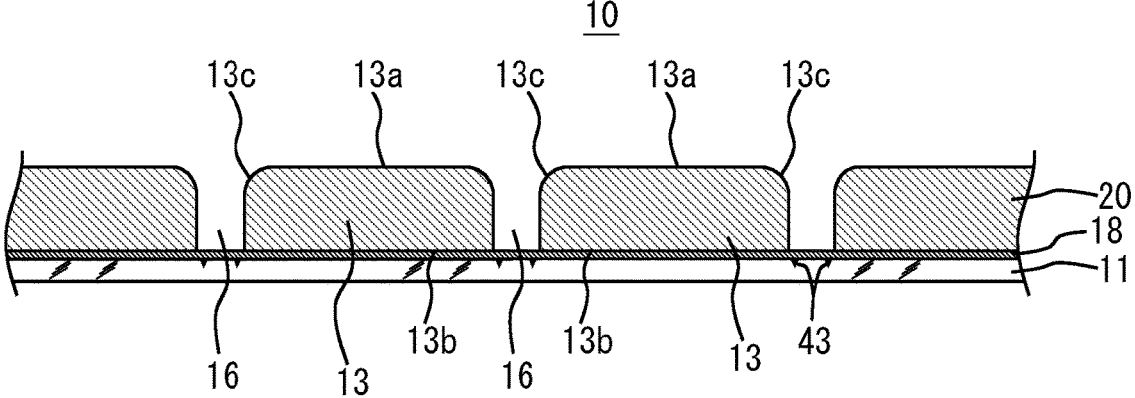
FIG. 4 is a cross-sectional view of a transfer sheet according to this embodiment.

As illustrated in FIG. 4, the transfer sheet 10 includes the core material layer 20, and the base material sheet 11 on which the core material layer 20 is laminated. The base material sheet 11 is created by cutting of an elongated base material sheet 11A (described later). On the surface of the base material sheet 11 on the core material layer 20 side, cutting flaws 43 (V-shaped grooves), which are created when the large number of plate-shaped flakes 13 are cut, remain (see FIGS. 9(a) to 9(c)). Further, in the core material layer 20, adjacent plate-shaped flakes 13 are separated with the gap 16 therebetween. In the core material layer 20, the chamfers 13c are formed in the perimeter of the principal surface 13a on the same side of each plate-shaped flake 13 in the thickness direction.

The large number of plate-shaped flakes 13 are peelably pasted to the surface of the base material sheet 11. Each plate-shaped flake 13 is held at the base material sheet 11 with a certain pressure-sensitive adhesive strength by a pressure-sensitive adhesive layer 18. In each plate-shaped flake 13, the principal surface 13b which is the opposite side to the principal surface 13a which is on the chamfer 13c side is pasted to the base material sheet 11. Note that, when the base material sheet 11 has pressure-sensitive adhesiveness on its surface, the pressure-sensitive adhesive layer 18 may be omitted.

The layout of the plate-shaped flakes 13 on the base material sheet 11 is the base of the layout of the plate-shaped flakes 13 in the core material layer 20 of the composite material 30. The plan view of the core material layer 20 of the transfer sheet 10 is the same as FIG. 3.

[Method of Manufacturing Composite Material]

The method of manufacturing the composite material 30 performs a first manufacturing process in which a foam roll 12 is manufactured, a second manufacturing process in which the transfer sheet 10 is manufactured using the foam roll 12 obtained by the first manufacturing process, and a third manufacturing process in which the composite material 30 is manufactured using the transfer sheet 10 obtained by the second manufacturing process, in this order. Note that the foam roll 12 corresponds to the elongated foam sheet.

In the first manufacturing process, a slice process in which a foam sheet 14 is created by slicing a foam block 35, and a sheet pasting process in which a large number of foam sheets (individual foam sheets) 14 created by the slice process are arranged successively and pasted onto the surface of the elongated base material sheet 11A are performed in this order, and therefore, the foam roll 12 which is rolled up and in which the large number of foam sheets 14 are lined up in the longitudinal direction of the base material sheet 11A is manufactured. Note that, in this embodiment, in addition to these processes, a sheet stretching process and an inspection process are carried out between the slice process and the sheet pasting process. Further, "a large number" of "a large number of foam sheets" herein means five or more. That is, the number of foam sheets 14 in the foam roll 12 is at least five or more (when using the foam block 35 having the size described in the following paragraph, the length of the foam roll 12 is 5,000 mm or more). Note that this number of sheets may also be ten or more (when the length of the foam roll 12 is 10,000 mm or more).

In the first manufacturing process, the foam block 35 and the base material sheet 11A are each prepared as material. As for the foam block 35, hard foam resin (e.g., polymeth-acrylimide (PMI) closed-cell foam material) having a sub-stantially rectangular parallelepiped shape may be used. The size of the foam block 35 is, for example, 2,000 mm in length, 1,000 mm in width, and 50 mm in thickness.

On the other hand, the base material sheet 11A is a rolled-up elongated sheet. The base material sheet 11A is uniform in thickness in the longitudinal direction, and the thickness is, for example, within a range of 0.01 mm or more and 0.5 mm or less. The width of the base material sheet 11A needs to be equal to or more than the width of the foam sheet 14, and in this embodiment, it is equal to the width of the foam sheet 14.

For the base material sheet 11A, a sheet or film made of resin (a thermoplastic resin sheet etc.) is used, for example. As the resin used for the base material sheet 11, various materials, such as polyethylene, polypropylene, urethane, polyester, polyethylene terephthalate (PET), or polycarbonate may be used. Note that, in this embodiment, pressure-sensitive adhesive, such as acrylic, urethane, or silicone adhesive, are applied entirely to one side of the base material sheet 11A. That is, the elongated base material sheet 11A is a pressure-sensitive adhesive tape (or slightly pressure-sensitive adhesive tape). Further, for the base material sheet 11A, those in which a separate sheet (not illustrated) is laminated on the back side may be used. Moreover, for the base material sheet 11, a sheet (or a film) made of rubber or paper may also be used, in addition to those made of resin.

In the slice process, slicing in which the foam block 35 is cut at a uniform thickness (within a range of 0.05 mm or more and 10 mm or less, which may be, for example, 0.05 mm or more and 2 mm or less) is performed. In this slicing, the foam block 35 is cut by a blade 36 for slice, while moving at least one of the foam block 35 and the blade 36 for slice in a fixed direction. In FIG. 5, the cutting is performed, while moving the foam block 35 among the blade 36 for slice and the foam block 35. In the slice process, the slicing is repeatedly performed for each of the plurality of foam blocks 35 so that a large number of foam sheets 14 with the same thickness are created. Note that, in FIG. 5, description of a member which fixes the blade 36 for slice is omitted.

Here, each foam sheet 14 obtained by the slicing is in a state where curl remains and it is curled up in the slicing direction. Therefore, in this embodiment, the sheet stretching process in which the curl of the foam sheet 14 is reduced is performed before the sheet pasting process. Further, normally, the density of the foam block 35 is not uniform, thereby possibly causing a variation in the weight of the large number of foam sheets 14 created in the slice process. Further, since the foam block 35 also varies in the hardness in association with the variation of the density, the thickness of the large number of foam sheets 14 created in the slice process may also vary. Therefore, in this embodiment, the inspection process in which the foam sheets 14 are sorted out or screened by inspecting at least one of the weight and the thickness is carried out, before the sheet pasting process.

Note that both the sheet stretching process and the inspection process may be omitted, or only one of them may be carried out. Alternatively, as for the inspection process, the inspection of only one of the weight and the thickness may be carried out. Further, as for the order of the sheet stretching process and the inspection process, the sheet stretching process may be carried out first, or the inspection process may be carried out first. Moreover, the sheet stretching process may be performed between the inspection process of the thickness and the inspection process of the weight.

In the sheet stretching process, one curled foam sheet 14 is fed at a time to a stretching device 55 illustrated in FIG. 6 so that the foam sheet 14 is stretched. The stretching device 55 is a device which drives a belt 56, and while conveying the foam sheet 14 fed in between adjacent rollers 72 and 74 by the belt 56, stretches the foam sheet 14 by letting the foam sheet 14 pass through between the belt 56 and the roller 74, and between adjacent rollers 73 and 74. In the stretching device 55, some rollers 73 and 74 are heat rollers, and therefore, the curl of the foam sheet 14 is effectively removed by heating the foam sheet 14 with the rollers 73 and 74.

In detail, the stretching device 55 includes a plurality of rollers 71-74, a belt 56 comprised of an endless belt, and a drive motor (not illustrated) which rotates at least one roller 71 in order to rotate the belt 56. The belt 56 is wound around the first roller 71, and the second roller 72 and the third roller 73 which are separated from the first roller 71. Further, the traveling path of the belt 56 is dented inwardly by the fourth roller 74 disposed between the second roller 72 and the third roller 73. The second roller 72, the third roller 73, and the fourth roller 74 are adjacent to each other in the up-and-down direction via a gap. In the stretching device 55, the foam sheet 14 fed in between the second roller 72 and the fourth roller 74 is stretched by being conveyed around the fourth roller 74, while being pinched between the fourth roller 74 and the belt 56, then passes through a gap between the third roller 73 and the fourth roller 74, and is further stretched, while being conveyed around the third roller 73. Then, the foam sheet 14 which is stretched substantially straight is conveyed to the first roller 71 side, and is picked up by an operator.

In the inspection process, the inspection of the weight and the thickness is carried out on the foam sheet 14 as a target to be inspected, and the foam sheets 14 are sorted out or screened. In this sorting, a screening standard which is defined for each of the weight and the thickness is used. The screening standard of the weight is that the weight measurement of the foam sheet 14 falls within an error range (e.g., ±10% range) of the designed value of the weight. On the other hand, the screening standard of the thickness is that the thickness measurement of the thickness 14 falls within an error range (e.g., ±10% range) of the designed value of the thickness. In the inspection process, the weight measurement and the thickness measurement are performed on each foam sheet 14, and the foam sheets 14 which do not meet at least one of the screening standards of the weight measurement and the thickness measurement are excluded, and thereby, only the foam sheets 14 which meet both the screening standards are selected.

Next, in the sheet pasting process, as illustrated in FIG. 7, the rolled base material sheet 11A set at a first reel 81 begins to be unwound, and it is then wound around a second reel 82. In this state, when the base material sheet 11A is wound by the second reel 82, the base material sheet 11A moves between the two reels 81 and 82. In the sheet pasting process, while repeating the movement and the stop of the base material sheet 11A, the foam sheet 14 is pasted to the base material sheet 11A between the two reels 81 and 82 during a period of stopping the base material sheet 11A. In the sheet pasting process, the plurality of foam sheets 14 are pasted so that they are arranged without overlapping with each other, without a gap (or with a small gap) in the longitudinal direction of the base material sheet 11A. Then, the base material sheet 11A to which the large number of foam sheets 14 are pasted is wound by the second reel 82 so that the foam roll 12 is created.

Note that, after the sheet pasting process, similarly to FIG. 20, a sheet connection process in which the foam sheets 14 which are adjacent to each other on the elongated base material sheet 11A are connected by a tape 85 may further be performed. In this case, the tape 85 corresponds to a connecting member, and it is pasted along a seam between the adjacent foam sheets 14, so that the adjacent foam sheets 14 are connected together.

Next, the second manufacturing process is described.

In the second manufacturing process, a cutting process in which each foam sheet 14 which constitutes the foam roll 12 is divided by cutting into a large number of plate-shaped flakes 13 is performed. In the cutting process, the transfer sheet 10 illustrated in FIG. 4 is manufactured by punching (press cutting) the foam sheet 14 in the state where it is pasted to the base material sheet 11A.

In the cutting process, the foam roll 12 is set to a reel 51 in a production line 50 illustrated in FIG. 8. Then, the foam sheet 14 is unwound from the foam roll 12 in the longitudinal direction together with the base material sheet 11A, and passes through a press device 15 illustrated in FIG. 9(*a*). Then, the foam sheet 14 on a lower mold 22 of the press device 15 is press-cut by being cut perpendicularly by the blades 24 of the upper mold 23. Here, as illustrated in FIG. 9(*b*), the base material sheet 11A is cut in a so-called "half cut" without being cut off (i.e., cut to the extent that the blades 24 do not penetrate the base material sheet 11A). A scrap or chip 39 is formed between the blades 24 (see FIG. 9(*c*)). In this embodiment, the large number of plate-shaped flakes 13 are formed on the base material sheet 11A, and the transfer sheet 10 is manufactured. Note that the plan-view shape of the blade 24 corresponds to the contour shape of the plate-shaped flake 13. For example, when forming the plate-shaped flake 13 in the regular hexagon, the blade 24 having the regular hexagonal shape in the plan view is used. In the upper mold 23, a large number of blades 24 are arranged in a two-dimensional plane with a gap therebetween. Further, in the punching, not the chamfer 13c but a burr may be formed in the perimeter of the principal surface 13*a* of each plate-shaped flake 13 depending on the cutting condition.

In this embodiment, the scrap 39 other than the large number of plate-shaped flakes 13 forms a mesh sheet 38, among the foam sheet 14 after the cutting. The mesh sheet 38 comprised of the scrap 39 is wound and removed by a take-up reel 25 (see FIG. 8). Further, a protective film 27 which is unwound from a roll provided to another reel 26 is laminated with the plate-shaped flake 13 side of the transfer sheet 10. The large number of plate-shaped flakes 13 are covered with the protective film 27. Further, in this embodiment, the elongated transfer sheet 10 is cut by a cutter 28 at a given length, and it is divided into a plurality of transfer sheets 10. Note that the winding by the take-up reel 25, covering with the protective film 27, and the cutting by the cutter 28 may be omitted.

Note that, although in this embodiment the upper mold 23 moves up and down with respect to the lower mold 22 upon the press cut, the press cut may be performed by rotary pressurization by a rotary mold (die cut roll).

Next, the third manufacturing process is described.

In the third manufacturing process, a transfer process in which the large number of plate-shaped flakes 13 on the transfer sheet 10 are transferred to a first skin material sheet 31A, and a laminating process in which a second skin material sheet 32A is laminated with the large number of plate-shaped flakes 13 transferred in the transfer process to create a laminated material 30B in which the large number of plate-shaped flakes 13 are sandwiched between the pair of skin material sheets 31A and 32A are performed in this order so that the composite material 30 is manufactured. The skin material sheets 31A and 32A are materials of the skin materials 31 and 32 described above (see FIG. 2), and, for example, semi-cured prepreg (prepreg sheet) may be used.

In the transfer process, first, the skin material sheet 31A is disposed on a forming die (e.g., a mold) 33. Next, as illustrated in FIG. 10(*a*), the transfer sheet 10 obtained by the second manufacturing process is disposed on the first skin material sheet 31A on the forming die 33 so that the plate-shaped flake 13 side is oriented thereto. Next, as illustrated in FIG. 10(*b*), the large number of plate-shaped flakes 13 of the transfer sheet 10 are pressed against the first skin material sheet 31A. The first skin material sheet 31A has pressure-sensitive adhesiveness on its surface. Therefore, the large number of plate-shaped flakes 13 are pasted to the first skin material sheet 31A. Then, as illustrated in FIG. 10(*c*), the base material sheet 11 is peeled off the large number of plate-shaped flakes 13. Thus, since the pressure-sensitive adhesive strength of the first skin material sheet 31A to the large number of plate-shaped flakes 13 is larger than the pressure-sensitive adhesive strength of the pressure-sensitive adhesive layer 18 to the large number of plate-shaped flakes 13, the large number of plate-shaped flakes 13 are transferred from the base material sheet 11 to the first skin material sheet 31A.

Next, in the laminating process, as illustrated in FIG. 11(*a*), the second skin material sheet 32A is first disposed apart from a laminated material 30A obtained by the transfer process so that it opposes to the plate-shaped flake 13 side of the laminated material 30A. Then, as illustrated in FIG. 11(*b*), the second skin material sheet 32A is laminated on the plate-shaped flake 13 side of the laminated material 30A. The second skin material sheet 32A has pressure-sensitive adhesiveness on its surface. Therefore, the large number of plate-shaped flakes 13 are pasted to the second skin material sheet 32A. Thus, a laminated material 30B in which the large number of plate-shaped flakes 13 are sandwiched between the pair of skin material sheets 31A and 32A is obtained.

Then, a forming process is performed when the matrix of the prepreg used for each of the skin material sheets 31A and 32A is thermosetting resin (e.g., epoxy resin). In the forming process, the laminated material 30B obtained by the laminating process is sealed using a bagging film. Then, the laminated material 30B sealed with the bagging film is heated for a given period of time (e.g., two hours) at a given temperature and a given pressure (e.g., 0.2 MPa and 130° C.) in an autoclave. In this process of heating, the semi-cured skin material sheets 31A and 32A become completely-cured skin materials 31 and 32. As a result, the composite material 30 which is formed in a given shape (in the case of FIG. 11(*b*), a flat-plate shape) and is cured is completed.

Note that, in the forming process, when heating the laminated material 30B, the resin (matrix) of the prepreg flows into the gaps 16 between the plate-shaped flakes 13, and the gaps 16 of the core material layer 20 are filled. The resin which flowed into the gaps 16 is hardened or cured. Therefore, a local strength reduction of the composite material 30 is suppressed. Further, the prepreg used as the material of each of the skin materials 31 and 32 may be large in the amount of resin per unit area, when the gap 16 is large.

Further, curing resin (for example, adhesives of thermosetting type, two-component reactive type, and moisture-reactive type) may be injected into the gaps 16 between the plate-shaped flakes 13 by using a pressure difference, in addition to the matrix of the prepreg. The injected resin is cured in the gap 16. Further, film-shaped adhesive may be added between the two skin materials 31 and 32. In this case, the film-shaped adhesive melts when heating the laminated material 30B, and the molten adhesive (resin) flows into the gap 16 and is cured eventually. In these cases, as illustrated in FIG. 12, the gap 16 between the adjacent plate-shaped flakes 13 is filled with the cured resin 6 so that the local strength reduction of the composite material 30 is suppressed and the rigidity improves as well. The filling of the curing resin can be performed even when the prepreg is not used for the material of the skin materials 31 and 32.

Note that, when the matrix of the prepreg used for each of the skin material sheets 31A and 32A is thermoplastic resin (e.g., polyamide resin, polypropylene resin, and polyether-ether-ketone resin), a curing process is performed after the forming process, such as pressurized heat press molding etc., by cooling the laminated material 30B in an atmosphere where the temperature is lower than the curing temperature of the matrix (e.g., a room temperature) so that the composite material 30 is completed.

Effects Etc. of this Embodiment

In this embodiment, the elongated foam sheet 12 is manufactured by arranging and pasting the large number of foam sheets 14 created by the slice process onto one side of the elongated base material sheet 11A. As described above, if they are foam sheets 14 with a short length, it is possible to prepare a large number of foam sheets 14 with a substantially uniform thickness. Therefore, by arranging and pasting the large number of foam sheets 14, the elongated foam sheet 12 of which the thickness is substantially uniform in the longitudinal direction can be manufactured.

Further, in this embodiment, since the curl of the foam sheet 14 is reduced by the sheet stretching process, the foam sheet 14 can be pasted to the correct position in the sheet pasting process.

Moreover, in this embodiment, since only the foam sheets 14 which meet the screening standards of each of the weight and the weight in the inspection process are pasted to the base material sheet 11A, the weight and the thickness in the longitudinal direction can be further equalized for the layer of the foam sheet 14 of the elongated foam sheet 12.

Further, in this embodiment, since the scrap 39 forms the mesh sheet 38 and it can be remove easily, the intermediate sheet 10 and the composite material 30 can be manufactured efficiently.

Moreover, in this embodiment, the large number of plate-shaped flakes 13 in the core material layer 20 are disposed using the transfer sheet 10. Therefore, it is not necessary to dispose the large number of plate-shaped flakes 13 individually, and the core material layer 20 can be formed easily.

<First Modification>

Figures 13, 14:
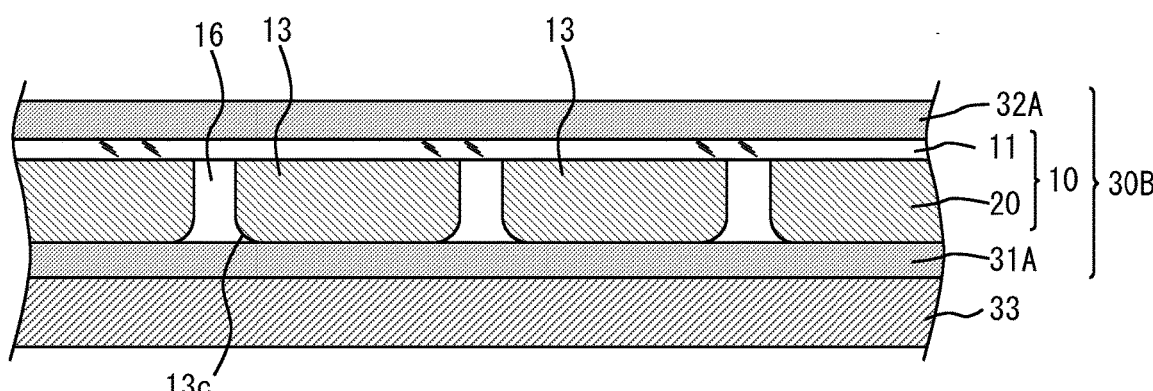
FIG. 13 is a cross-sectional view of a laminated material in a production process of a composite material according to a first modification.
FIG. 14 shows cross-sectional views illustrating a transfer process in a production process of a core material sheet for adhesion according to a second modification.

In this modification, the laminated material 30B illustrated in FIG. 13 is manufactured by sandwiching the intermediate sheet 10 between the pair of skin material sheets 31A and 32A in the laminating process as it is, without performing the transfer process. In this case, the intermediate sheet 10 is used as the core material sheet for adhesion in which the base material sheet 11 is molten. Note that, when the intermediate sheet 10 is used as the transfer sheet, pressure-sensitive adhesive is used so that each plate-shaped flake 13 is peelable from the base material sheet 11, but when it is used as the core material sheet for adhesion, not only pressure-sensitive adhesive but also adhesive may be used for pasting the foam sheet 14 to the base material sheet 11.

In detail, in the third manufacturing process, the intermediate sheet 10 and the second skin material sheet 32A are laminated in this order with the first skin material sheet 31A on the forming die 33. Here, as for the lamination of the intermediate sheet 10, as illustrated in FIG. 13, the plate-shaped flake 13 side may be pasted to the first skin material sheet 31A. Alternatively, the base material sheet 11 side may be pasted to the first skin material sheet 31A (not illustrated). Then, the laminated material 30B is obtained as a result of the lamination of the second skin material sheet 32A. Since the method of manufacturing the composite material 30 from the laminated material 30B is the same as in the above embodiment, explanation thereof is omitted. Note that, if the amount of resin filled in the gap 16 is insufficient, a resin sheet (e.g., sheet-shaped adhesive or prepreg) may be laminated with one side or both sides of the core material layer 20. Further, a plurality of intermediate sheets 10 may be used as the core material sheet for adhesion for the production of one sheet of composite material 30.

<Second Modification>

In this modification, in the transfer process, the large number of plate-shaped flakes 13 on the transfer sheet 10 are not transferred to the first skin material sheet 31A, but they are transferred to sheet-shaped adhesive 111.

In detail, in the transfer process, as illustrated in FIGS. 14(a) and 14(b), the sheet-shaped adhesive 111 is pasted to the plate-shaped flake 13 side of the transfer sheet 10 (first intermediate sheet). The sheet-shaped adhesive 111 has a separate sheet 141 laminated with the back thereof. Next, as illustrated in FIG. 14(c), by removing or peeling the base material sheet 11 from the large number of plate-shaped flakes 13, the large number of plate-shaped flakes 13 are transferred to the sheet-shaped adhesive 111 so that a core material sheet 60 for adhesion is manufactured as a second intermediate sheet. Then, in the laminating process, similarly to the core material sheet 10 for adhesion of the first modification, the laminated material 30B is manufactured by sandwiching the core material sheet 60 for adhesion between the pair of skin material sheets 31A and 32A.

<Third Modification>

In this modification, in the transfer process, the large number of plate-shaped flakes 13 on the transfer sheet (first intermediate sheet) 10 are transferred to a prepreg 31A, and a sheet for composite material production (second intermediate sheet) 70 illustrated in FIG. 15 is manufactured. That is, in the second intermediate sheet, the semi-cured prepreg 31A is used, instead of the sheet-shaped adhesive 111 of the second modification. The prepreg 31A may have the separate sheet 141 laminated with the back thereof. The prepreg 31A corresponds to the skin material sheet. Then, in the laminating process, the sheet 70 for composite material production is placed on a mold, while the prepreg 31A is lower, and a prepreg 32A corresponding to the skin material sheet is laminated from above.

<Fourth Modification>

In this modification, as illustrated in FIG. 16, a composite material 130 is further provided with a second core material layer 21 having a large number of plate-shaped flakes 13 which are arranged along the surface of the second skin material 32, and a middle adhesive layer 17 disposed between the first core material layer 20 and the second core material layer 21. The middle adhesive layer 17 is constituted using a sheet-shaped adhesive (also referred to as the "film-shaped adhesive" or "adhesive sheet") which is molten by heating and heat-cured as it is, and adheres the first core material layer 20 and the second core material layer 21.

As for the method of manufacturing the composite material 130 according to this modification, the laminated material before the forming process can be manufactured by a procedure of laminating the core material sheet for adhesion, in which the first core material layer 20 and the middle adhesive layer 17 are integrated, on the first skin material sheet 31A on the mold, then transferring the large number of plate-shaped flakes 13 from the transfer sheet 10 to the middle adhesive layer 17, and further laminating the second skin material sheet 32A. Alternatively, it can also be manufactured by a procedure of placing the sheet 70 for composite material production of the third modification on the mold, while the prepreg 31A is lower, and laminating the core material sheet 10 for adhesion of the first modification, and a prepreg 32A in this order from thereabove.

Note that, although in this modification the core material layers 20 and 21 are two layers, the core material layers 20 and 21 may also be three or more layers. Also in this case, the middle adhesive layer 17 is provided between the core material layers 20 and 21 which are adjacent to each other in the thickness direction. Alternatively, a prepreg or thermosetting resin sheet (epoxy resin etc.) may be used for the middle adhesive layer 17, without using the sheet-shaped adhesive.

In this modification, there are two layers of plate-shaped flakes 13 in the core material layer 20. Here, when forming a curved composite material 30, since the tensile strain in one side of the plate-shaped flake 13 becomes larger as the thickness of the plate-shaped flake 13 becomes larger, the one side of the plate-shaped flake 13 may be damaged by the tensile strain depending on the thickness or the bending amount of the plate-shaped flake 13. On the other hand, in this modification, when comparing the composite materials with the same thickness, each plate-shaped flake 13 becomes thinner compared with the case where the composite material 30 has one-layer structure of the plate-shaped flake 13. Therefore, the tensile strain caused at one side of each plate-shaped flake 13 becomes smaller so that it is hard to cause the damage, even if a hard resin foam material with low toughness is used for the plate-shaped flake 13. According to this modification, the composite material 30 excellent in formability into a three-dimensional shape can be provided.

<Fifth Modification>

In this modification, as illustrated in FIG. 17, a composite material 131 has a canape structure. Further, in the core material layer 20 on the skin material 31, strip-shaped plate-shaped flakes 13 are arranged in a certain direction. A gap 16 is formed between adjacent plate-shaped flakes 13. Note that, although in FIG. 17 the plate-shaped flake 13 is not divided in its longitudinal direction, the plate-shaped flake 13 may be divided in its longitudinal direction.

In this modification, in the cutting process, a transfer sheet (not illustrated) where the strip-shaped plate-shaped flakes 13 are arranged in the certain direction on the base material sheet 11A is manufactured by punching (press cutting) the foam sheet 14 in the state where it is pasted to the base material sheet 11A. Then, in the transfer process, the large number of plate-shaped flakes 13 on the transfer sheet are transferred to the skin material sheet 31A, such as prepreg.

Note that a cylindrical body 100 can be manufactured by rolling the composite material 131 in a cylindrical shape. When the composite material 131 is rolled up, while the skin material 31 side faces inside, the cylindrical body 100 illustrated in FIG. 18 can be obtained. In this case, the core material layer 20 is laminated on both ends 31a of the skin material 31, and is laminated so that one of the ends 31a serves as a pasting margin on the inner circumferential surface (a pasting part to the skin material 31 immediately outside), and the other end 31a covers the outermost plate-shaped flake 13. Alternatively, the cylindrical body 100 can be obtained also by winding the composite material 131 so that the skin material 31 side faces outside. In this case, one end 31a is laminated to cover the innermost plate-shaped flake 13, and the other end 31a serves as the pasting margin on the outer circumferential surface (a pasting part to the skin material 31 immediately inside). The end 31a of the skin material 31 is laminated on the innermost part so that it covers a plurality of plate-shaped flakes 13.

<Other Modifications>

In the above embodiment, the foam sheet 14 may be cut by laser cut, instead of the press cut, so that it is divided into the large number of plate-shaped flakes 13. Alternatively, the foam sheet 14 may be cut and divided into the large number of plate-shaped flakes 13, by using a cutting device which moves a blade along the shape to be cut (a cutting plotter).

Although in the above embodiment the adjacent plate-shaped flakes 13 in the core material layer 20 are separated with the gap 16 therebetween, the adjacent plate-shaped flakes 13 may be separated by a cut or notch 40. In this case, as illustrated in FIGS. 19(a) and 19(b), the adjacent plate-shaped flakes 13 are cut by the same blade 24. For example, when fabricating the plate-shaped flake 13 in a regular hexagon, the blades 24 with the regular hexagon arrangement pattern is used. Then, as illustrated in FIG. 19(c), when drawing out the blade 24, the plate-shaped flakes 13 which have been elastically deformed in the state of FIG. 19(b) restores its original shape, and the cut 40 remains between the adjacent plate-shaped flakes 13.

Although in the above embodiment the elongated base material sheet 11 is used for production of the elongated foam sheet, the base material sheet 11 may be omitted. That is, the method of manufacturing the elongated foam sheet may perform the sheet connection process in which the large number of foam sheets 14 are arranged in the certain direction and are connected by the connecting member (tape) 85 to manufacture the elongated foam sheet in which the large number of foam sheets 14 are lined up (see FIG. 20).

In the above embodiment, after connecting the plurality of (e.g., two to ten) foam sheets 14 by the connecting member 85 so that they are lined up in the certain direction, the large number of foam sheets 14 may be pasted to the base material sheet 11.

Although in the above embodiment the core material layer 20 of the island structure is formed by using the part of the foam sheet 14 of the elongated foam sheet 12 inward of the blade 24 used for the punching as the core material, the part inward of the blade 24 may be used as the scrap and the part outward of the blade 24 may be used as the core material. In this case, in the punching, a full cut in which both the foam sheet 14 and the base material sheet 11 are cut all way in the thickness direction by the blades 24 is performed, instead of the half cut described above. The core material layer 20 becomes a structure where a large number of cells (cells with the plan-view shape of the blades 24) are formed, and when the plan-view shape of the blade 24 is a regular hexagon, it becomes a honeycomb structure.

In the above embodiment, a thinning slicing may be applied as the slicing of the slice process. In the thinning slicing, as illustrated in FIG. 21(a), by letting the foam block 35 pass in the width direction of an endless thin band knife 80 through a straight part of the rotating band knife 80, the foam block 35 is sliced and the foam sheet 14 is created. In this case, as illustrated in FIG. 21(b), the foam block 35 may be fed into the band knife 80 by rollers 81, or as illustrated in FIG. 21(c), a table 82 on which the foam block 14 is placed may be moved to feed the foam block 35 to the band knife 80. Since the curl is hardly produced in the foam sheet 14 by the thinning slicing, the sheet stretching process may be eliminated. Note that FIG. 21(a) is a perspective view and FIGS. 21(b) and 21(c) are cross-sectional views. Further, in FIG. 21(a), illustration of pulleys etc. which rotate the band knife 80 is omitted.

In the above embodiment, metal may be used as the material of the skin materials 31 and 32. In this case, each plate-shaped flake 13 is joined to the skin materials 31 and 32 with adhesive.

Although in the above embodiment the hard foam resin is used for the material of the plate-shaped flake 13, when performing the slice process, a type of foam material which can form the foam block 35 of the substantially rectangular parallelepiped shape by the foaming can be conveniently used, and therefore, types of foam materials other than the hard foam resin may also be used. Further, also when the slicing is not performed, the types of foam materials other than the hard foam resin may also be used.

In the above embodiment, the shapes of all the plate-shaped flakes 13 in the core material layer 20 may not be necessarily the same. For example, the plan-view shapes of the plate-shaped flakes 13 in a part of the composite material 30 may be determined according to a curvature of the part.

In the above embodiment, the composite material 30 illustrated in FIG. 2 may have a canape structure, while omitting the second skin material 32. In this case, the plate-shaped flake 13 side of the composite material 30 is pasted to the structural material to be reinforced. The core material layer 20 is sandwiched between the first skin material 31 and the structural material to be reinforced. Note that, although the core material layer 20 of the canape structure does not form a central layer like the sandwich structure, it forms the central layer between the first skin material 31 and the structural material to be reinforced, after being pasted to an object to be reinforced.

INDUSTRIAL APPLICABILITY

The present disclosure is applicable to the method of manufacturing the elongated foam sheet used for materials, such as composite material.

DESCRIPTION OF REFERENCE CHARACTERS

10 Transfer Sheet (Intermediate Sheet)
11 Base Material Sheet
11A Elongated Base Material Sheet
12 Foam Roll (Elongated Foam Sheet)
13 Plate-shaped Flake
14 Foam Sheet
20 Core Material Layer
30 Composite Material
31, 32 Skin Material
31A, 32A Skin Material Sheet
35 Foam Block
36 Blade for Slice

What is claimed is:

1. A method of manufacturing an elongated core-material sheet, comprising the step of: performing a sheet pasting process in which a large number of core-material sheets are arranged and pasted onto one side of an elongated base material sheet to manufacture the elongated core-material sheet where the large number of core-material sheets are lined up in a longitudinal direction of the elongated base material sheet, wherein, in the sheet pasting process, a removable-type pressure-sensitive adhesive is used to paste the large number of core-material sheets to the elongated base material sheet, in the elongated core-material sheet, the large number of core-material sheets are peelable and transferable from the elongated base material sheet, further performing, before the sheet pasting process, a slice process in which the core-material sheet is created by slicing a foam block and a sheet stretching process in which a curl of the core-material sheet created by the slice process is reduced by passing through a stretching device that heats and stretches the core-material sheet, and, wherein, in the sheet pasting process, the core-material sheet that is reduced in the curl by the sheet stretching process is pasted to the base material sheet, wherein the stretching device comprises a plurality of rollers which stretches the core-material sheet while conveying the core-material sheet, and the plurality of rollers includes a heat roller which heat the core-material sheet.

2. The method of claim 1, wherein the large number of core-material sheets are five or more core-material sheets, the sheet pasting process is performed with no gaps between the adjacent core-material sheets, and each of the core-material sheets is a plain sheet with a rectangular shape.

3. A method of manufacturing an elongated core-material sheet, comprising the step of:
performing a sheet pasting process in which a large number of core-material sheets are arranged and pasted onto one side of an elongated base material sheet to manufacture the elongated core-material sheet where the large number of core-material sheets are lined up in a longitudinal direction of the elongated base material sheet,
wherein, in the sheet pasting process, a removable-type pressure-sensitive adhesive is used to paste the large number of core-material sheets to the elongated base material sheet, in the elongated core-material sheet, the large number of core-material sheets are peelable and transferable from the elongated base material sheet,
further performing, before the sheet pasting process, a slice process in which the core-material sheet is created by slicing a foam block, and an inspection process in which the core-material sheet created by the slice process is inspected for at least one of a weight and a thickness, as a target to be inspected, and the core-material sheet that satisfies a screening standard is screened,
wherein, in the sheet pasting process, the core-material sheet that satisfies the screening standard in the inspection process is pasted to the base material sheet.

4. The method of claim 1, wherein the core-material sheet is a sheet of hard foam material.

5. A method of manufacturing composite material, comprising the step of:
performing a sheet pasting process in which a large number of core-material sheets are arranged and pasted onto one side of an elongated base material sheet to manufacture the elongated core-material sheet where the large number of core-material sheets are lined up in a longitudinal direction of the elongated base material sheet,
wherein, in the sheet pasting process, a removable-type pressure-sensitive adhesive is used to paste the large number of core-material sheets to the elongated base material sheet,
further performing a cutting process in which a core-material sheet that constitutes the elongated core-material sheet manufactured by the sheet pasting process is divided into a large number of plate-shaped flakes by cutting, and a laminating process in which the large number of plate-shaped flakes divided by the cutting process are sandwiched between a pair of sheets for skin material.

6. The method of claim 5, comprising the step of:
further performing, after the sheet pasting process and before the cutting process, a sheet connection process in which the core-material sheets that are adjacent to each other on the elongated base material sheet are connected by a connecting member.

7. The method of claim 6, wherein a scrap other than the large number of plate-shaped flakes among the core-material sheet after the cutting is removed by winding.

8. The method of claims 5, wherein,
in the cutting process, an intermediate sheet in which the large number of plate-shaped flakes are pasted to the elongated base material sheet is created,
after the cutting process, a transfer process in which the large number of plate-shaped flakes on the intermediate sheet are transferred to one of the pair of sheets for skin material is performed, and
in the laminating process, the other of the pair of sheets for skin material is laminated to the large number of plate-shaped flakes transferred by the transfer process.

9. The method of claims 5, wherein,
in the cutting process, an intermediate sheet in which the large number of plate-shaped flakes are pasted to the elongated base material sheet is created, and
in the laminating process, the intermediate sheet is sandwiched between the pair of sheets for skin material.

10. The method of claim 2, wherein in the sheet pasting process the five or more core-material sheets are arranged and pasted onto one side of the elongated base material sheet in a row in the longitudinal direction of the elongated base material sheet.

11. The method of claims 1, wherein the stretching device further comprises an endless belt which is wound around the plurality of rollers, and the stretching device stretches the core-material sheet in conveying the core-material sheet while sandwiching between the endless belt and the roller by rotating the endless belt.

12. The method of claims 11, wherein the plurality of rollers includes three rollers which are adjacent to each other in a determine direction, and the stretching device stretches the core-material sheet in conveying the core-material sheet while sandwiching between the endless belt and the roller on two gaps between two rollers of the three rollers.

13. The method of claims 3, wherein in the inspection process a weight measurement and a thickness measurement are performed on the core-material sheet created by the slice process, the core-material sheet which do not satisfy at least one of the screening standards of the weight measurement and the thickness measurement are excluded, and only core-material sheet which satisfies both the screening standards are selected.

14. The method of claims 1, wherein a length of the elongated base material sheet is 5 m or more.

15. The method of claims 1, wherein a thickness of the elongated base material sheet is 0.05 mm to 10 mm.

16. The method of claims 1, wherein a thickness of the elongated base material sheet is 0.05 mm to 2 mm.

17. The method of claims 1, wherein the elongated core-material sheet is wound on a reel after the sheet pasting process.

* * * * *